United States Patent
Hung

(10) Patent No.: US 7,792,678 B2
(45) Date of Patent: Sep. 7, 2010

(54) METHOD AND DEVICE FOR ENHANCING ACCURACY OF VOICE CONTROL WITH IMAGE CHARACTERISTIC

(75) Inventor: Chin-Fu Hung, Taipei (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1243 days.

(21) Appl. No.: 11/352,347

(22) Filed: Feb. 13, 2006

(65) Prior Publication Data

US 2007/0200912 A1      Aug. 30, 2007

(51) Int. Cl.
*G10L 21/00* (2006.01)
*G06K 9/00* (2006.01)
*G06K 9/62* (2006.01)

(52) U.S. Cl. .................. 704/275; 704/270; 382/181; 382/209; 382/254

(58) Field of Classification Search ............. 704/270, 704/275; 382/181, 209, 224, 254
See application file for complete search history.

(56) References Cited

U.S. PATENT DOCUMENTS

| | | | |
|---|---|---|---|
| 6,133,904 A * | 10/2000 | Tzirkel-Hancock | 704/275 |
| 6,289,140 B1 * | 9/2001 | Oliver | 382/313 |
| 6,654,721 B2 * | 11/2003 | Handelman | 704/270 |
| 6,801,604 B2 * | 10/2004 | Maes et al. | 379/88.17 |
| 6,993,486 B2 * | 1/2006 | Shimakawa | 704/275 |
| 7,499,859 B2 * | 3/2009 | Lu et al. | 704/270 |
| 2004/0119837 A1 * | 6/2004 | Inoue | 348/207.99 |
| 2004/0174434 A1 * | 9/2004 | Walker et al. | 348/211.3 |
| 2005/0144009 A1 | 6/2005 | Rodriguez et al. | |
| 2005/0225787 A1 * | 10/2005 | Yonaha | 358/1.9 |
| 2006/0045312 A1 * | 3/2006 | Bernstein et al. | 382/103 |

* cited by examiner

*Primary Examiner*—James S Wozniak
(74) *Attorney, Agent, or Firm*—Zhigang Ma

(57) ABSTRACT

A device includes an image capturing device having a speech recognition device and a receiving device. The speech recognition device includes a voice command unit stored a plurality of voice commands, a voice character memory unit stored a plurality of voice characteristics corresponding to the voice commands for indentifying the commands conforming to the voice characteristics received in the receiving device to form a voice command set, and an image characteristic memory unit stored a plurality of image characteristics corresponding to the voice commands of the voice command set. The image capturing device captures a real-time image to compare with the image characteristic in the image characteristic memory unit. The image capturing device selects a command from the command set and executes the selected command according to the comparing result generated by the image capturing device.

17 Claims, 3 Drawing Sheets

METHOD AND DEVICE FOR ENHANCING ACCURACY OF VOICE CONTROL WITH IMAGE CHARACTERISTIC

FIELD OF THE INVENTION

This invention relates to a method and device for enhancing the accuracy of voice control with image characteristics; more particularly, to the commands of checking image characteristics which are used to enhance the accuracy of voice control.

BACKGROUND OF THE INVENTION

In the past, the facilities such as digital camera, audio or camcorder are controlled via either its control buttons or a remote controller. The operator can manipulate it by simply pressing the control buttons on the remote controller without touching the facilities. However, it would be inconvenient and troublesome if the operator cannot get or find the remote controller anywhere while using those facilities.

The new verbal control technique enables the operator to remotely manipulate the facilities without using a remote controller. The principle is to receive operator's verbal instructions with a receiving device, such as a microphone; after analyzing the characters of the verbal instructions, a related command selected from a voice command unit is performed. Speech recognition technique has been developed for years, and the related patents of the technique are applied constantly whether domestic or abroad. However, the traditional speech recognition technique is not precise or sufficiently accurate for applications of verbal control because there are so many factors such as noise, tone, speaking speed and so on, which make it difficult for a precise and accurate recognition of speech.

What is need is to provide a device and methods to enhance the accuracy and precision of voice control.

SUMMARY OF THE INVENTION

The purpose of the present disclosure is to provide an image double checking procedure installed into the process of recognizing the voice command to improve the accuracy of voice control.

To achieve this purpose, the present disclosure provides a method and device of using image characters to assist with voice recognition. The device is equipped with a voice character memory unit, a voice command unit and an image characteristic memory unit for remote operation. The method includes the following steps: (a) to receive a verbal instruction, to check its character with samples stored in a voice character memory unit, to identify all of the voice commands related to the verbal instruction from a voice command unit, and to make those related voice commands as a voice command set; (b) to take a real-time image from a scene via an image capturing device, and to compare the characters of the real-time image with samples stored in an image characteristic memory unit and obtain a result; (c) in accordance with the result of the step (b), to find out a most reasonable voice command from the voice command set of step (a); (d) to perform the most reasonable voice command of step (c).

It is to be understood that both the foregoing general description and the following detailed description are exemplary and explanatory only and are not to be considered as restrictive of the present disclosure.

BRIEF DESCRIPTION OF THE DRAWINGS

The accompanying drawings, which are incorporated in and constitute a part of this specification, illustrate several embodiments of the invention and, together with the descriptions, serving as explanations of the principles of the present disclosure.

DETAILED DESCRIPTION OF THE PREFERRED EMBODIMENTS

To understand the purposes, benefits and features of the present disclosure readily, exemplary embodiments of the present disclosure are disclosed for giving further illustration accompanied with the drawings.

Figure 1:
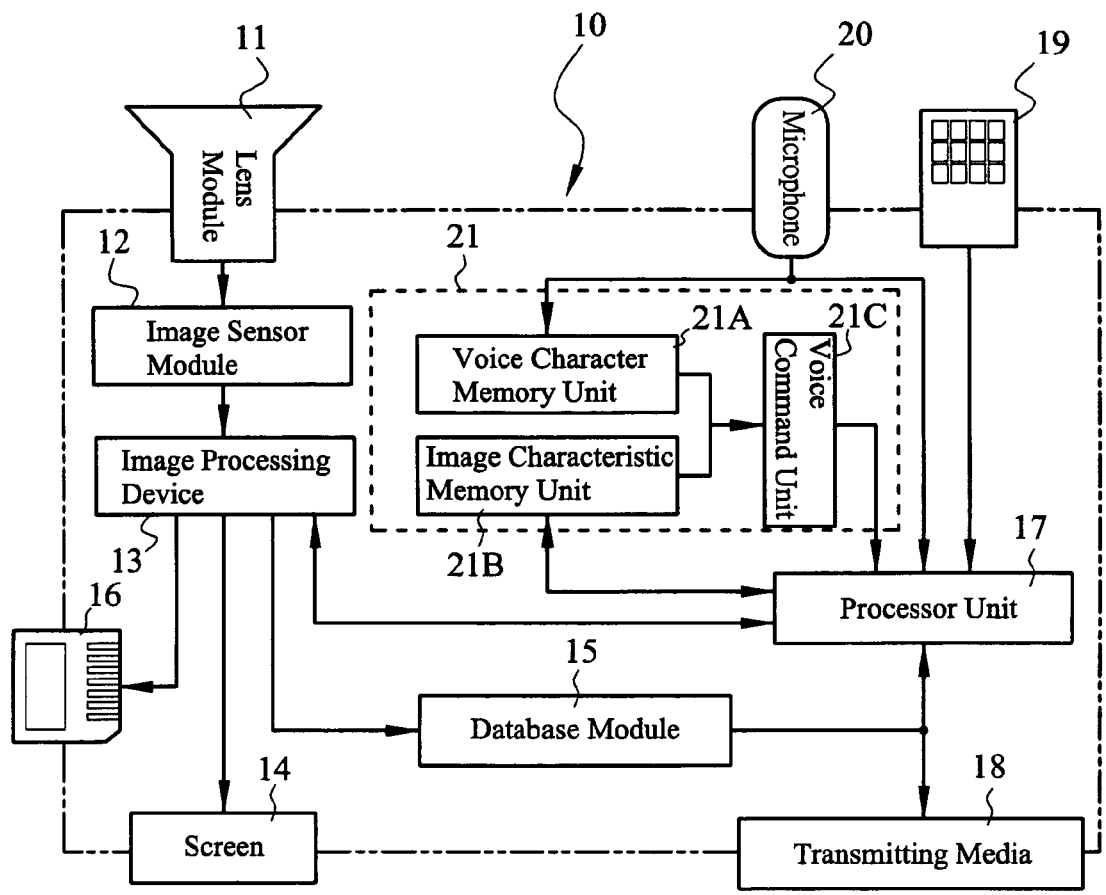
FIG. 1 shows a block diagram of a device for enhancing accuracy of voice control with image characteristic of the present disclosure.

Referring to FIG. 1, an image capturing device (10) is shown. The image capturing device (10) includes a lens module (11), an image sensor module (12), an image processing device (13), a screen (14), a database module (15), a memory unit (16), a processor unit (17), a transmitting media (18), a control button (19), a microphone (20), and a speech recognition device (21). The microphone (20) is used for receiving a verbal instruction. The lens module is used for taking optic images. The optic images are then transformed into digital images via the image sensor module (12). After processing, the digital images appear on the screen (14) and are saved in the database module (15) and the memory unit (16). In operation, an operator inputs a command through both the control button (19) and the speech recognition device to the processor unit (17), for implementing filming, recording, browsing, adding, deleting and/or transmitting the files. The transmitting media (18) can be the transmitter module, such as a Bluetooth module, USB port, 1394 port or optical fiber port. These transmitters could connect to a computer, a mobile phone or other audio/video facilities. The speech recognition device (21), and other components of the image capturing device are the same as the prior art and therefore there is no need to be detailed.

The speech recognition device (21) includes a voice character memory unit (21A), an image characteristic memory unit (21B), and a voice command unit 21C). The commands of the voice command unit (21C) are associated with the voice character memory unit (21A) and the image characteristic memory unit (21B). The verbal instruction is received via the microphone (20) and checked by the voice character memory unit (21A) whereby finding the command with the character responds to the instruction from the voice command unit (21C). Owning to the different voice speed, pitch, volume, or different accents of different people, false decision could be made if anyone of above reasons has not been taken into account. To broaden the contrast conditions and select the commands related to the voice character, therefore, a command set is formed by such commands.

Upon taking the optical image by the lens module (11), a real-time image signal is produced via the image sensor module (12) and the image processing device (13) in order to reflect the circumstance of locale at that time when the verbal instruction has been made. The speech recognition device (21) then compares the character of the image signal with the samples stored in the image memory unit (21B) to get a result from the comparison. The result is re-checked or sifted out, the set commands selected via the voice command unit (21C), and a most reasonable command is determined, and then performed by the processor unit (17). The so-called image signal character includes but not limited to the brightness and the figure outlines, which are measured to reflect the conditions of commands, for example, the brightness of the locale reflected by the speech recognition device (21) according to the image; the determination of the voice command of ISO value whether the operator intends to adjust the ISO value higher or lower; the position decided according to the human figure outline in order to make a proper focus of a camera by adjusting the image appeared on the screen of the camera.

The relationship between the image memory unit (21B) and the voice command unit (21C) can be predetermined during assembly as using different definition of the image character to correspond to the different command set. Of course, the relationship of the image memory unit (21B) and the voice command unit (21C) can be modified after it has been sold to an operator regarding its profession or special purpose to do further editing, adding or deleting.

The commands of the voice command unit (21C) can be pre-stored during assembly. Such as setting a first voice command set to browse which can include the commands of "save", "delete", "zoom out", "zoom in", "left", "right", "up", "down", "send", or "send all" and so on.

The voice command unit (21C) as the exemplary embodiment of the present disclosure can also include a second command set to focus on images. The commands of focusing on the human face including the remote voice commands of "on face", "left" to move the focus towards left, "right" to move the focus towards right, "up" to move the focus upward or "down" to move the focus downward and so on.

Furthermore, the voice command unit (21C), as the exemplary embodiment of the present disclosure can further include a third command set of ISO value adjusting. Such as the commands of "up" for insufficient brightness, "down" for exceeding brightness, "on" for turning the flash, "up" for enhancing the brightness, or "down" for reducing the brightness of the flash and so on.

Figure 2:
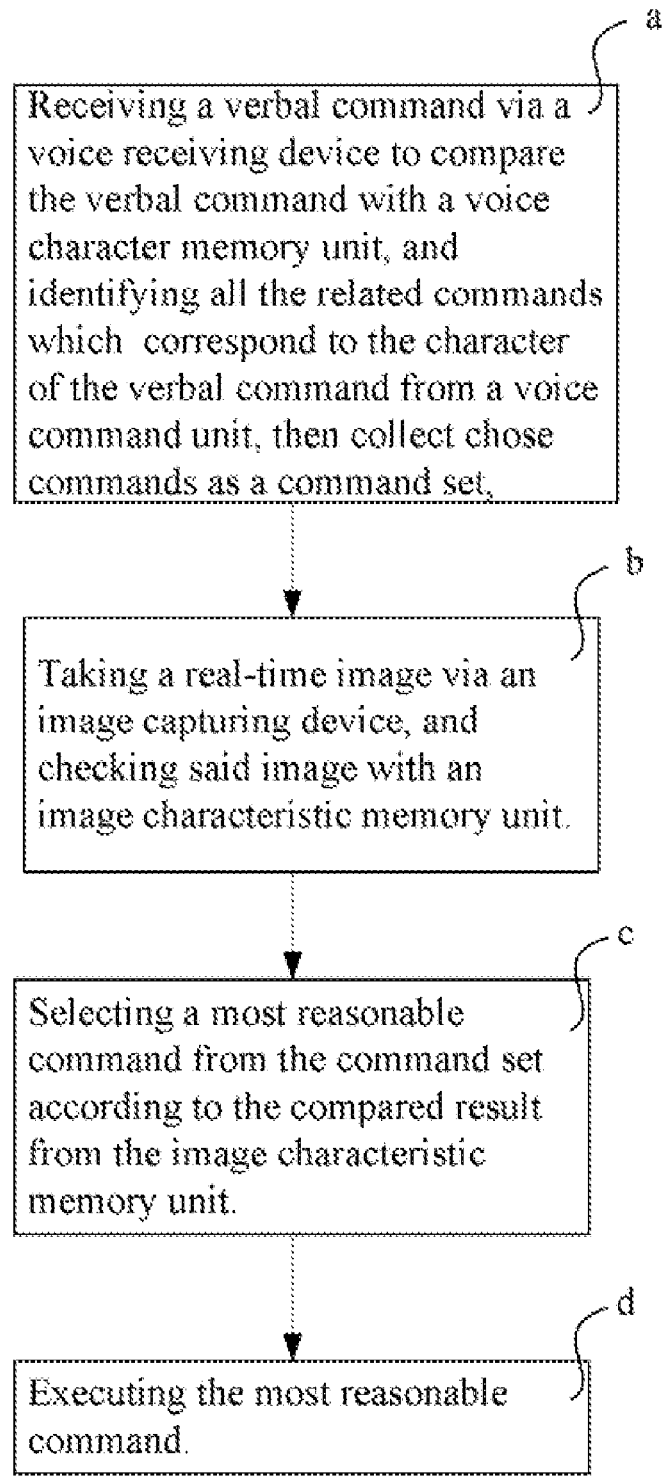
FIG. 2 shows a block diagram of a method for enhancing accuracy of voice control with image characteristics in accordance with one exemplary embodiment of the present disclosure.

Referring to the FIG. 1 and FIG. 2, a method for enhancing accuracy of voice control with image characteristic of exemplary embodiment of the present disclosure has following steps of:

(a) receive a verbal instruction via a voice receiving device, the character of the verbal instruction compares with the templates stored in a voice character memory unit, whereby indentifying all the related commands correspond to the character of the verbal command from a voice command unit, then collecting those commands as a command set;

(b) takes a real-time image via an image capturing device, and checking the image with an image characteristic memory unit;

(c) selecting a most reasonable command from the command set according to the compared results from the image characteristic memory unit; and (d) performing the most reasonable command.

Such method for enhancing accuracy of voice control with image characteristic can not only enhance accuracy of voice control but also reduce the false in operation.

Wherein the voice receiving device of step (a) can be the microphone (20) of FIG. 1. Indentifying the corresponding voice character from the voice character memory unit (21A) after receiving the verbal instruction. Therefore, a command corresponding to the character can be indentified from the voice command unit (21C). For example, when receiving the voice command of "up", the same voice command might be found and selected either in the—first command set to browse, the second command set to focus or the third command set to adjust ISO value. The step collects the related commands that are selected.

The image capturing device can be the image processor device (13) as FIG. 1 according to the step (b) and (c). A character of real-time image is produced by the image processor device (13) and the character is then compared with the image characteristic memory unit (21B) in order to find out a most reasonable voice command from the voice command set. For example, when the comparison result from the image characteristic memory unit (21B) shows no further input of new image, then it can be presumed that the operator is browsing the image, therefore, the voice command of "up" must be the "upper part image browsing" of the first command set. When the result is insufficient brightness with new input image, then the voice command can be presumed as the "enhancing ISO value" of the third command set; and if the result is "input of new image with sufficient brightness", then the voice command can be presumed as "moving upward the focus" of second command set.

Figure 3:
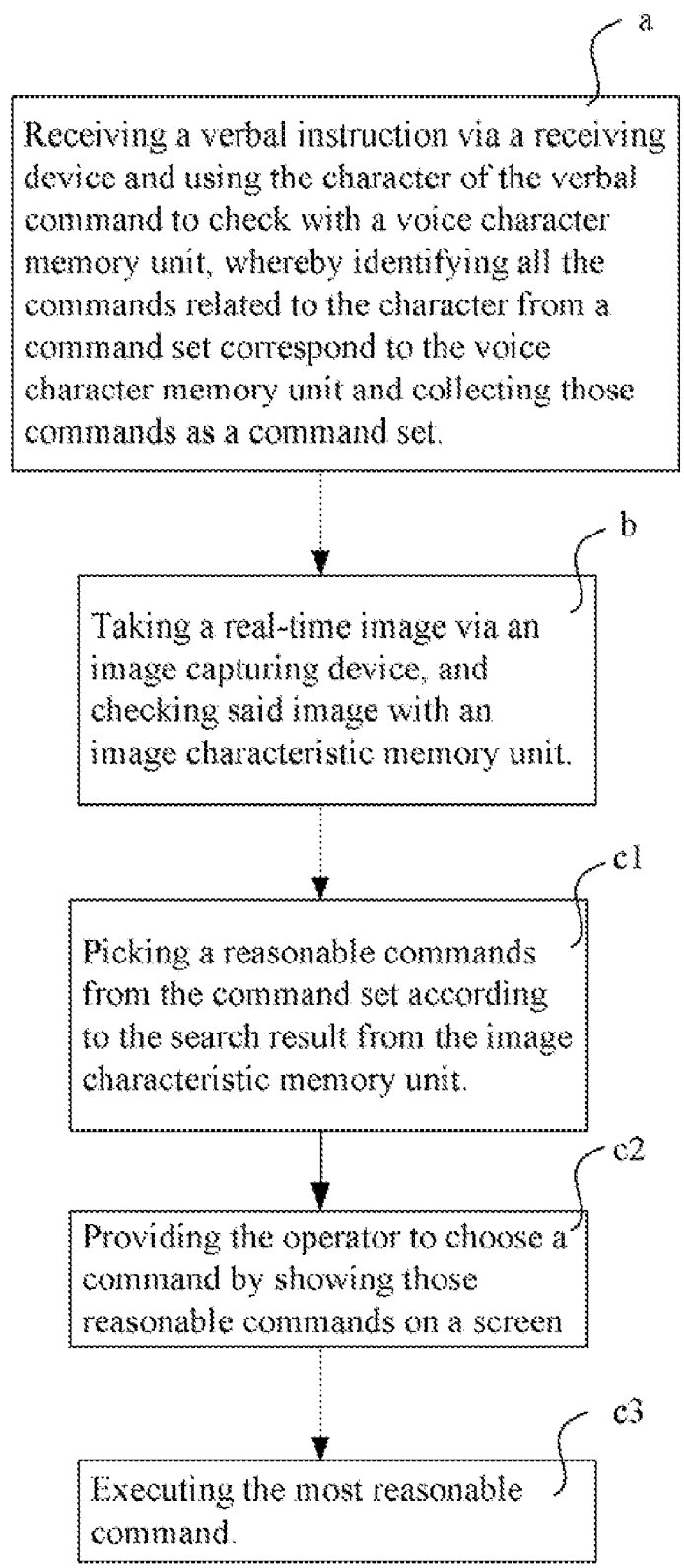
FIG. 3 shows a block diagram of a method for enhancing accuracy of voice control with image characteristics in accordance with another exemplary embodiment of the present disclosure.

It is easy for one of ordinary skill in the art to infer other variations from above illustrations and embodiments, and may be adjusted or modified further according the demand and preference of different consumers' categories. For example, too many voice commands would confuse the customer with bad memory and therefore may not be acceptable. The designer just needs to reasonably reduce the number of the voice commands. Nevertheless, the definition cannot be pre-determined if reducing too many voice commands. Therefore, other embodiments according to FIG. 3 are the following steps of:

(a) receiving a verbal instruction via a receiving device and using the character of the verbal instruction to check with a voice character memory unit, whereby indentifying all the commands related to the character from a command set corresponding to the voice character memory unit and collecting those commands as a command set;

(b) taking a real-time image via an image capturing device, and checking the image within an image characteristic memory unit;

(c1) picking reasonable commands from the command set according to the search result from the image characteristic memory unit;

(c2) providing those reasonable commands to an operator to choose by showing those reasonable commands on a screen; and (d1) performing the command chosen by the operator.

Although the embodiment of FIG. 3 requires the operator to choose the commands. The selection of the commands needs verbal instruction finally, as follows: step (c1), has selected a more reasonable command set by using the image character, and step (c2), further selecting and showing the line of the command set on the screen, which can be the screen (14) of FIG. 1. This operation method is of benefit to the operator who is forgetful since the operator can read the command they need by watching the screen and is a relief to them.

The methods provided above can improve the accuracy of the voice control and may avoid some false responses of the remote voice control in such a device.

The advantages of this invention over the prior art includes:

1. enhancing the accuracy of voice control by such method of using the character of real-time image to compare with the image in the image characteristic memory unit to further select or re-check the voice commands selected according to the locale circumstance at that time and therefore, the most or most likely reasonable commands can be sifted out and enhance the accuracy of voice control.

2. keeping the cost down because the digital camera has the functions of image capturing and processing. Therefore, it is no need to add extra costly hardware to this invention; that is to say, the application to the digital camera of this invention would only need to add a voice character memory unit, an image characteristic memory unit, a related command set and software to enhance the accuracy of voice remote control.

While the disclosure has been presented by way of example and in terms of exemplary embodiments, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A device for enhancing the accuracy of voice control with image characteristic comprising: an image capturing device provided with a speech recognition device to perform a remote control via verbal instructions uttered by an operator and received by a receiving device equipped in the image capturing device; wherein the speech recognition device comprises a voice command unit containing a plurality of voice commands for the operator to manipulate the image capturing device; a voice character memory unit containing a plurality of voice characteristics corresponding to the voice command unit, whereby the commands to conform to voice characteristics of the verbal instructions are determined and compiled to form a voice command set; and an image characteristic memory unit which saves a plurality of image characteristics corresponding to the voice commands of the voice command set; the image capturing device comprises a lens module configured for capturing a light, an image sensor module configured for transferring the captured light into a real-time image, an image processing device configured for providing a real-time image characteristic of the real-time image to compare with the image characteristic stored in the image characteristic memory unit and generate a comparing result, and a processor unit configured for selecting a command from the command set according to the comparing result and executing the selected command.

2. The device of claim 1, wherein the receiving device is a microphone.

3. The device of claim 1, wherein the image capturing device is selected from the group consisting of a digital camera, a digital camcorder and a camera mobile phone.

4. The device of claim 1, wherein the voice command unit comprises a command to move a focus of the image capturing device while taking images.

5. The device of claim 1, wherein the image characteristic memory unit comprises the characteristics for checking brightness sufficiency; the voice command unit comprises at least one command corresponding to the images.

6. The device of claim 1, wherein the voice command unit comprises a command of "up" for increasing ISO value upon insufficient brightness and a command of "down" for reducing ISO value upon excessive brightness.

7. The device of claim 1, wherein the voice command unit comprises a plurality of remote voice commands of "on" for opening a flashlight equipped in the image capturing device, "up" for increasing brightness of the flashlight and "down" for reducing brightness of the flashlight.

8. A method for enhancing accuracy of voice control with image characteristic comprising a manipulation of an image capturing device which is provided with a speech recognition device and to perform a remote control via some verbal instructions uttered by an operator and received by a receiving device equipped in the image capturing device; the speech recognition device includes a voice character memory unit, an image characteristic memory unit and a voice command unit, the method comprising the steps of: (a) receiving a verbal instruction via the receiving device and using a character of the received verbal instruction to check with the voice character memory unit; (b) identifying all the commands related to the character of the received verbal instruction from a command set corresponding to the voice character memory unit and collecting those commands as a command set; (c) taking a real-time image via the image capturing device, comparing the real-time image with the images stored in the image characteristic memory unit, and generating a compared result; (d) selecting a command from the command set according to the compared result from the image characteristic memory unit; and (e) executing the selected command.

9. The method of claim 8, wherein the image capturing device includes a lens module, an image sensor module, an image processing device and a processor unit to use the image sensor module to transfer the light captured by the lens module into an image, and to use the image processing device to provide a real-time image character to check with the image characteristic memory unit.

10. The method of claim 8, wherein the image capturing device is selected from the group consisting of a digital camera, a digital camcorder and a camera mobile phone.

11. The method of claim 8, wherein the voice command unit includes a command for moving a focus of the image capturing device while taking images.

12. The method of claim 8, wherein the image characteristic memory unit includes the characteristics for checking brightness sufficiency, and the voice command unit including at least one command corresponding to the images.

13. The method of claim 8, wherein the voice command unit includes a command of "up" for increasing ISO value upon insufficient brightness and a command of "down" for reducing ISO value upon exceeding brightness.

14. The method of claim 8, wherein the voice command unit includes a plurality of remote voice commands of "on" for opening the flashlight, "up" for increasing brightness of flashlight and "down" for reducing brightness of flashlight.

15. A method for enhancing accuracy of voice control with image characteristic consists of an image capturing device which is provided with a speech recognition device and to perform a remote control via some verbal instructions uttered by an operator and received by a receiving device equipped in the image capturing device; the speech recognition device includes a voice character memory unit, an image characteristic memory unit and a voice command unit, the method comprising the steps of: (a) receiving a verbal instruction via the receiving device and using a character of the verbal instruction to check with the voice character memory unit, and identify all the commands related to the character from a command set corresponding to a the voice character memory unit and collecting those commands as a command set; (b) taking a real-time image via the image capturing device, and searching a corresponding image stored in the image characteristic memory unit matched with the real-time image in image characters, then generating a search result; (c1) picking one or more reasonable commands from the command set according to the search result from the image characteristic memory unit; (c2) showing those reasonable commands on a screen for the operator to choose a desired command from the shown commands; and (d1) performing the command chosen by the operator.

16. The method of claim 15, wherein the image capturing device includes a lens module, an image sensor module, an image processing device and a processor unit to use the image sensor module to turn the light beams captured by the lens module into an image, and to use the image processing device which provides a real-time image character to check with the images stored in the image characteristic memory unit.

17. The method of claim 15, wherein the image capturing device is selected from the group consisting of a digital camera, a digital camcorder and a camera mobile phone.

* * * * *